United States Patent
Su et al.

(10) Patent No.: US 7,966,368 B2
(45) Date of Patent: Jun. 21, 2011

(54) COMMUNICATING MESSAGES OVER TRANSIENT CONNECTIONS IN A PEER-TO-PEER NETWORK

(75) Inventors: Philip Ti-Fei Su, Redmond, WA (US); Robert J. Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1366 days.

(21) Appl. No.: 10/427,941

(22) Filed: May 2, 2003

(65) Prior Publication Data
US 2004/0221043 A1 Nov. 4, 2004

(51) Int. Cl.
*G06F 15/16* (2006.01)
*H04W 4/00* (2009.01)
(52) U.S. Cl. .................. 709/204; 709/227; 455/466
(58) Field of Classification Search .............. 709/227; 713/164
See application file for complete search history.

(56) References Cited

U.S. PATENT DOCUMENTS

| | | | |
|---|---|---|---|
| 5,216,675 A * | 6/1993 | Melliar-Smith et al. | 714/748 |
| 5,805,825 A * | 9/1998 | Danneels et al. | 709/243 |
| 5,940,082 A * | 8/1999 | Brinegar et al. | 345/442 |
| 6,016,505 A * | 1/2000 | Badovinatz et al. | 709/205 |
| 6,212,548 B1 * | 4/2001 | DeSimone et al. | 709/204 |
| 6,295,550 B1 * | 9/2001 | Choung et al. | 709/204 |
| 6,304,898 B1 * | 10/2001 | Shiigi | 709/206 |
| 6,363,421 B2 * | 3/2002 | Barker et al. | 709/223 |
| 6,484,196 B1 * | 11/2002 | Maurille | 709/206 |
| 6,505,253 B1 * | 1/2003 | Chiu et al. | 709/235 |
| 6,564,249 B2 | 5/2003 | Shiigi | |
| 6,604,129 B2 * | 8/2003 | Slutsman et al. | 709/204 |
| 6,910,069 B1 * | 6/2005 | Holt et al. | 709/221 |
| 6,920,497 B1 * | 7/2005 | Bourassa et al. | 709/227 |
| 6,980,518 B1 * | 12/2005 | Sun et al. | 370/235 |
| 6,981,223 B2 * | 12/2005 | Becker et al. | 715/753 |
| 2002/0035604 A1 * | 3/2002 | Cohen et al. | 709/205 |
| 2002/0129106 A1 * | 9/2002 | Gutfreund | 709/205 |
| 2002/0152299 A1 * | 10/2002 | Traversat et al. | 709/223 |
| 2003/0051029 A1 * | 3/2003 | Reedy et al. | 709/224 |
| 2003/0135552 A1 * | 7/2003 | Blackstock et al. | 709/205 |
| 2003/0135565 A1 * | 7/2003 | Estrada | 709/206 |
| 2003/0163525 A1 * | 8/2003 | Hendriks et al. | 709/204 |
| 2003/0171125 A1 * | 9/2003 | Oprescu-Surcobe et al. | 455/458 |

(Continued)

FOREIGN PATENT DOCUMENTS

EP 1 209 849 A2 5/2002

(Continued)

OTHER PUBLICATIONS

European Search Report dated Mar. 30, 2005.

(Continued)

*Primary Examiner* — Ranodhi N Serrao
*Assistant Examiner* — Joiya M Cloud
(74) *Attorney, Agent, or Firm* — Shook, Hardy & Bacon L.L.P.

(57) ABSTRACT

Systems and methods useful in communicating messages over a peer-to-peer network, optionally over transient connections to participants in a collaborative session (e.g., an "electronic whiteboard" session), are described. Examples include establishing a session for data transfer, wherein participants easily enter and leave the session without losing data or connections between the participants. Participants in a session may gain access to and catch up with data previously transmitted. Various data structures are useful for communicating messages. Such data structures may be used for transmitting message data or identification data to participants.

15 Claims, 13 Drawing Sheets

U.S. PATENT DOCUMENTS

| | | | |
|---|---|---|---|
| 2003/0195976 A1* | 10/2003 | Shiigi | 709/230 |
| 2004/0006708 A1* | 1/2004 | Mukherjee et al. | 713/201 |
| 2004/0008635 A1* | 1/2004 | Nelson et al. | 370/260 |
| 2004/0019641 A1* | 1/2004 | Bartram et al. | 709/205 |
| 2004/0034773 A1* | 2/2004 | Balabine et al. | 713/168 |
| 2004/0205781 A1* | 10/2004 | Hill et al. | 719/328 |
| 2004/0215784 A1* | 10/2004 | Qi et al. | 709/227 |
| 2006/0010202 A1* | 1/2006 | Blackstock et al. | 709/204 |

FOREIGN PATENT DOCUMENTS

| | | | |
|---|---|---|---|
| EP | 1209849 A2 * | 5/2002 | |
| JP | 11-272534 | 11/1998 | |
| JP | 2001-331469 | 5/2000 | |

OTHER PUBLICATIONS

Wolfgang Broll, "Distributed Virtual Reality for Everyone—a Framework for Networked VR on the Internet", IEEE, Proceedings of the 1997 Virtual Reality Annual International Symposium (VRAIS '97), pp. 121-128.

Partial European Search Report dated Aug. 6, 2004.

* cited by examiner

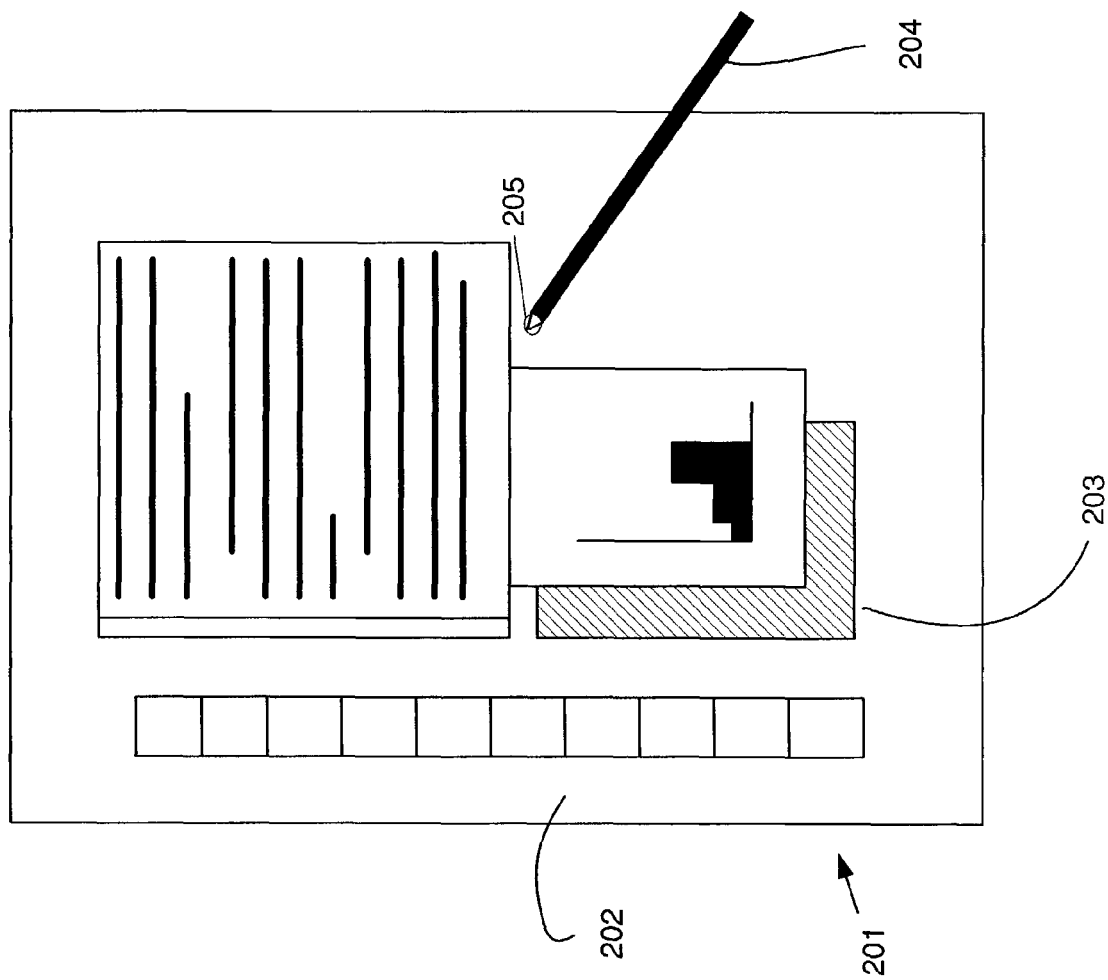

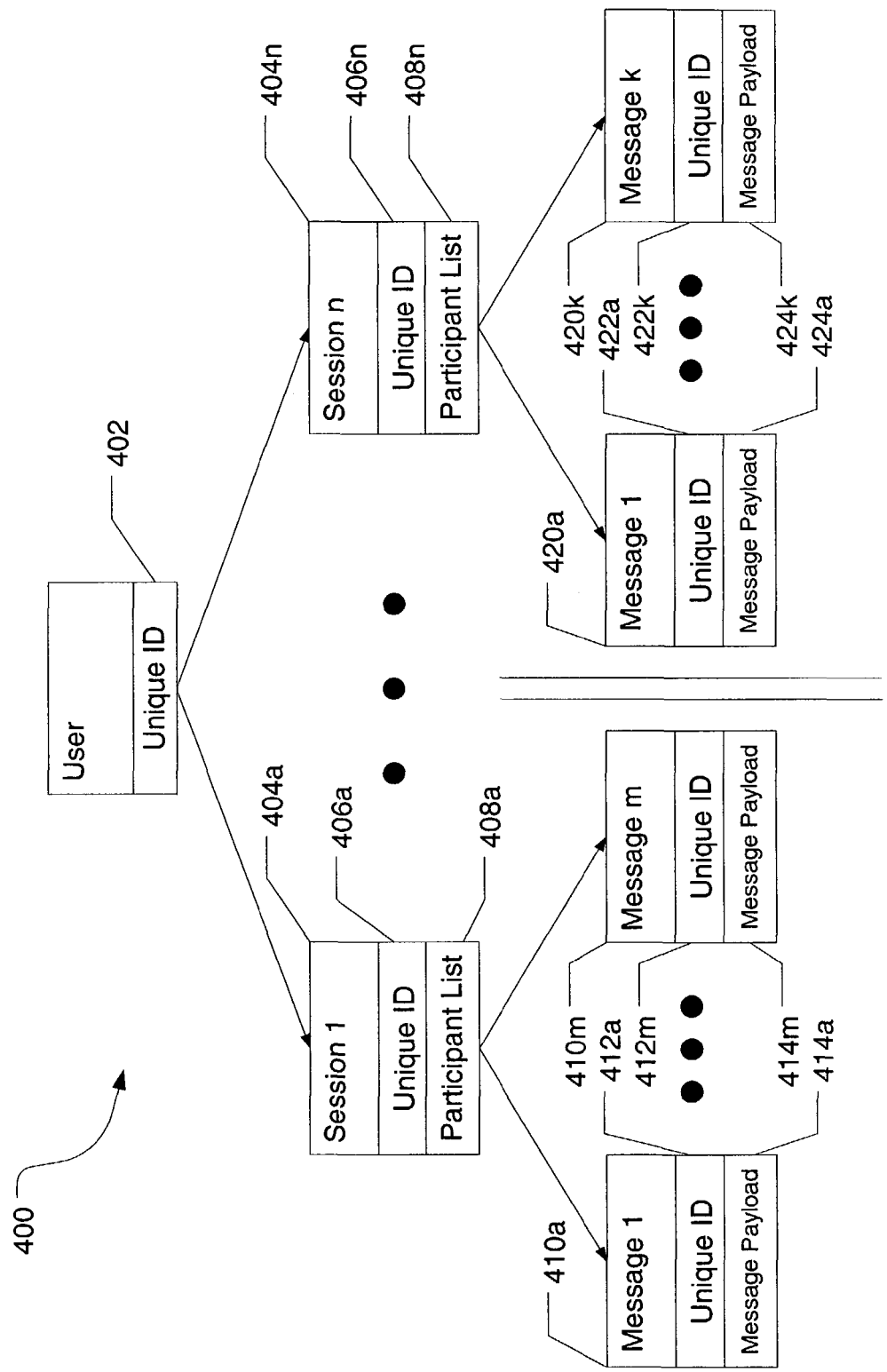

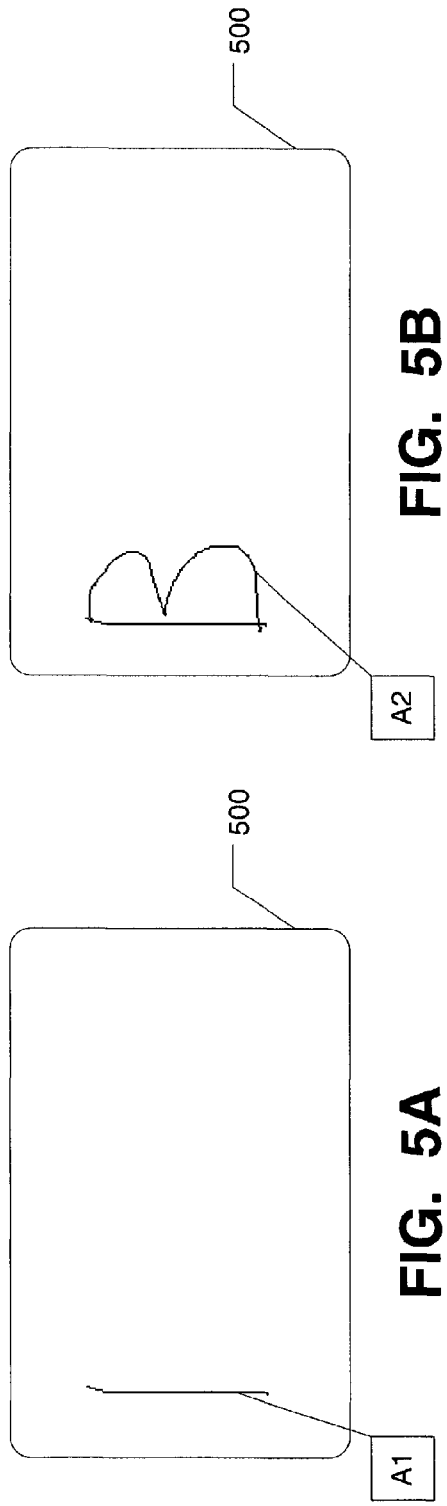
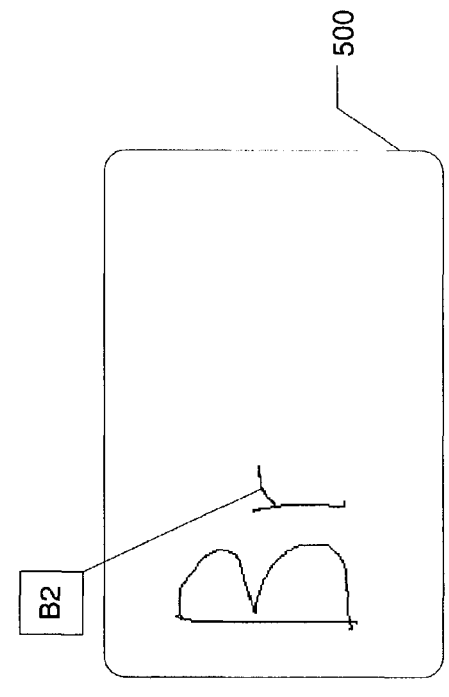
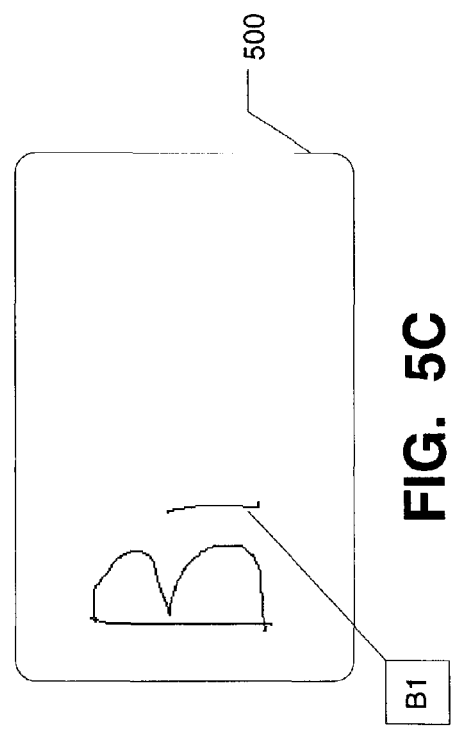
FIG. 5A
FIG. 5B
FIG. 5C
FIG. 5D

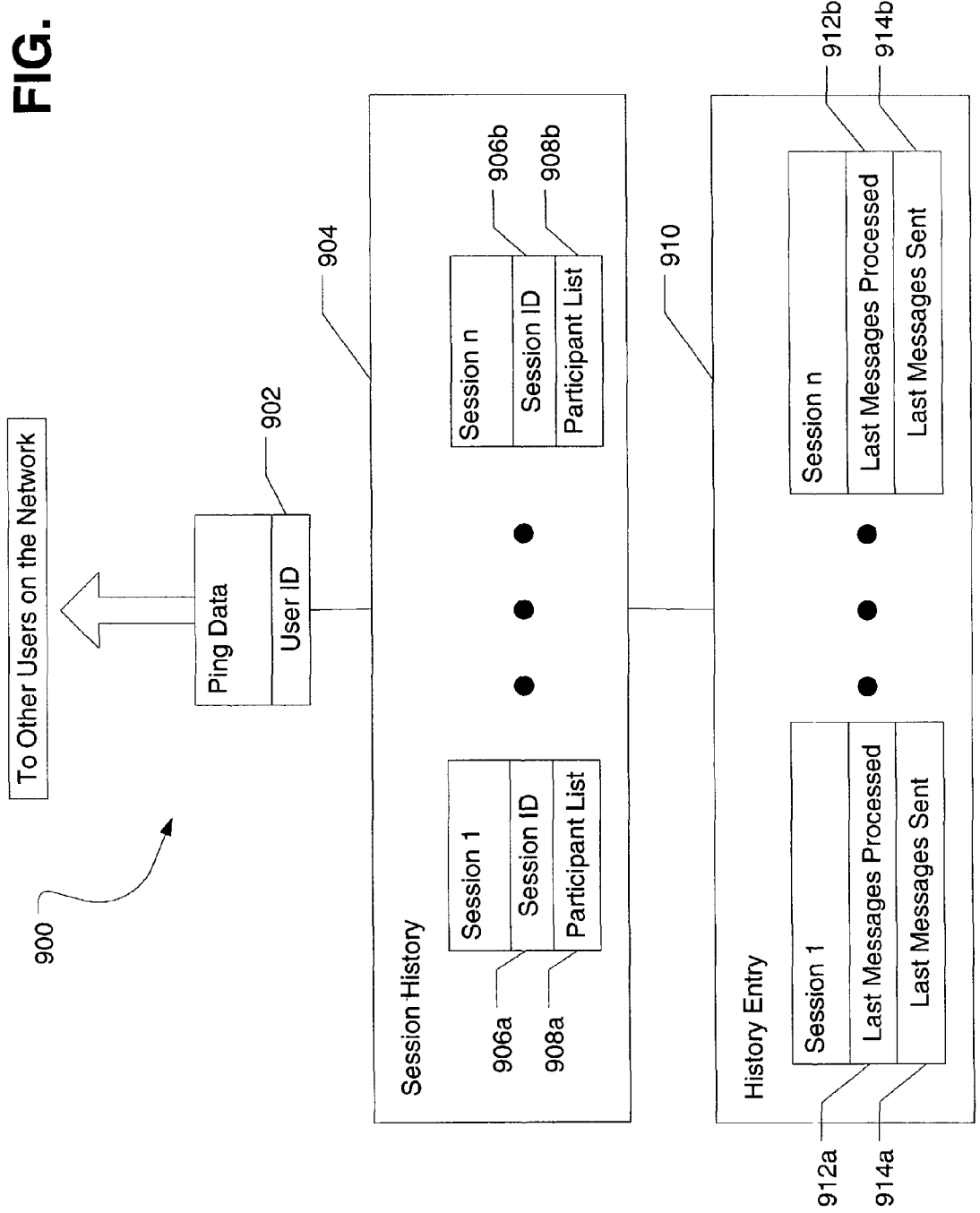

COMMUNICATING MESSAGES OVER TRANSIENT CONNECTIONS IN A PEER-TO-PEER NETWORK

FIELD OF THE INVENTION

The present invention generally relates to systems, methods, and data structures for communicating messages over a peer-to-peer network. Such systems, methods, and data structures may be used, for example, to communicate messages over transient connections to participants in a collaborative session, such as an "electronic whiteboard" session or the like.

BACKGROUND

Various collaborative applications are known that allow users at different workstations to concurrently share electronic data and information and all simultaneously view the same information, make changes to the information in real time, and view the changed information (akin to an "electronic whiteboard" session, a "NetMeeting®" session ("NetMeeting®" is a registered trademark of Microsoft Corporation of Redmond, Wash.), or a "WebEx®" session ("WebEx®" is a registered trademark of WebEx Communication Inc. of San Jose, Calif.)). Such applications typically utilize a common server, and all participants connect into the application and the electronic whiteboard session via the common server. Thus, as the various session participants send data messages that add, delete, and/or otherwise modify data, the server processes the messages and makes the results available to the participants.

In many instances, two or more session participants will send incoming and possibly conflicting messages to the electronic whiteboard session with respect to existing data on the system. In such instances, the server determines which incoming data messages are processed, as well as the processing order of the incoming signals, and it resolves any conflicting and/or inconsistent incoming message data instructions according to some predetermined protocol (typically the time of receipt).

Alternatively, in some instances, rather than connecting to a common server, one participant's machine in a session is designated as the de facto "server." In that instance, this participant's machine resolves conflicting or incoming message data (again, typically based on the time of the incoming data message to that machine).

While such available electronic whiteboard sessions using an actual or de facto server are useful, they suffer from certain disadvantages that limit their usefulness. For example, setting up an electronic whiteboard session and informing potential participants of the information necessary to join the session can be a time-consuming and confusing project, particularly if numerous participants need to or may need to be involved. Users typically need to log into the session, using a previously obtained password and other connection information. It may be difficult, at least in some instances, for the party setting up the electronic whiteboard session to determine who should receive and have access to the log in information. While this security may be necessary in some situations for sensitive communications, these advance-planning requirements make it inconvenient and sometimes impossible to use electronic whiteboard communications, particularly if a session is needed in an impromptu manner. Moreover, if a potential participant does not receive or cannot locate the required log in information, she may be unable to join into the session or substantially delayed in joining it. Additionally, many users may not know the server to use for these various types of sessions, which hampers their ability to join into a session.

Many communications do not require this level of security. For example, employees of a single company located within the company's facilities communicating over a local subnet or an intranet may not need the added log in and security features of typical electronic whiteboard communications.

Additionally, use of a single server (actual or defacto) can cause data transfer difficulties if the transmission is interrupted for any reason. Transmission interruptions occur frequently, particularly for users connected to the system through transient connections, such as wireless connections. Interruption of a wireless connection (or other connection) may result in the need for users to re-log into the session, causing delays and communication difficulties. Additionally, if the user of the machine serving as the de facto server leaves a session for any reason, this may result in interruptions and/or session failure for the other remaining users.

Accordingly, there is a need in the art for an application that will allow plural users to reliably communicate with one another using data messages in a collaborative manner (e.g., in an electronic whiteboard session) that avoids one or more of the various disadvantages described above. Such a system should allow participants to freely enter and leave the session while still enabling reliable transmission of all the message data to all participants in the session, including to participants that arrive late and/or after other participants have left the session.

SUMMARY

Aspects of the present invention relate to systems, methods, and data structures useful in communicating messages over a peer-to-peer network, optionally through transient connections to participants in a collaborative session (e.g., an "electronic whiteboard" session). In one aspect, the invention relates to systems and methods for establishing a session for data transfer that enables participants to easily enter and leave the session without losing data or losing connections between the participants, even when participants leave the session or lose connection to the session, for example, because of the transient nature of their connection. In another aspect, the invention relates to systems and methods that allow participants to easily gain access to and catch up with the data previously transmitted in an ongoing session. Various data structures also are useful in various systems and methods for communicating messages. Such data structures may be used for broadcasting a message payload to participants in a session. Other useful data structures may include data for broadcasting a user's identification data throughout a network, optionally when the user is involved in a data transfer session including plural participants. By broadcasting the message payload and user identification data, other users on the network can easily determine whether they are to be involved in an ongoing session and join the session.

BRIEF DESCRIPTION OF THE DRAWINGS

The above and other objects, features, and advantages of the present invention will be readily apparent and fully understood from the following detailed description, taken in connection with the appended drawings, in which:

FIG. 2 illustrates a pen-based personal computing (PC) environment in which certain aspects of the present invention may be implemented;

FIG. 4 generally illustrates data and information that may be maintained by the various individual participants using systems and methods according to some examples of this invention;

FIG. 9 is an example data structure for an outgoing user identifier message useful in some examples of systems and methods according to the present invention;

DETAILED DESCRIPTION

Figure 1:
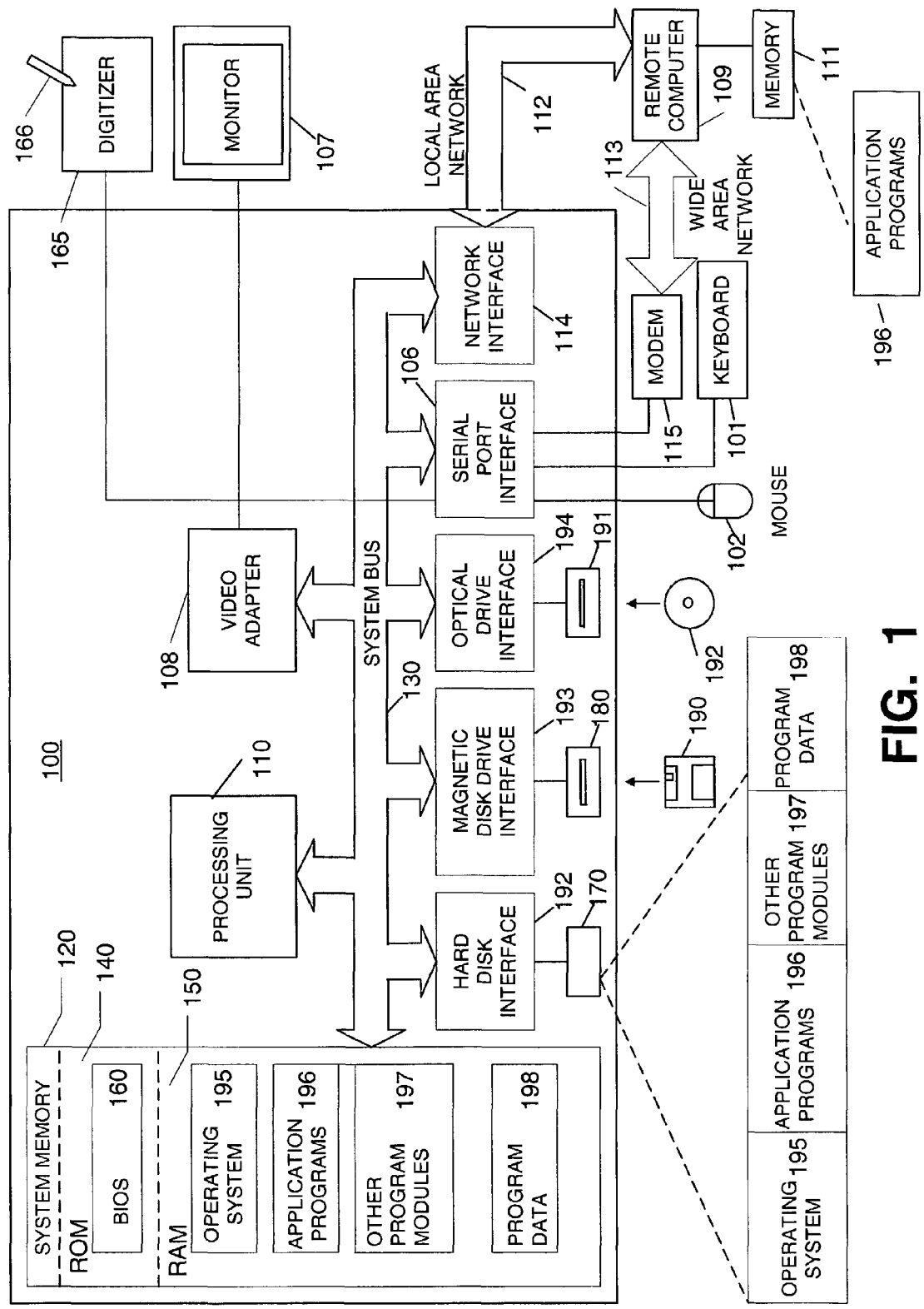
FIG. 1 illustrates a schematic diagram of a general-purpose digital computing environment in which certain aspects of the present invention may be implemented.

As described above, aspects of the present invention relate to systems, methods, and data structures for communicating messages over a peer-to-peer network, including communicating between workstations connected together using transient connections, such as wireless connections. The following description is divided into sub-sections to assist the reader. The sub-sections include: Terms; General Description of Various Aspects of the Invention; Example Hardware; Example Systems, Methods, and Data Structures According to the Invention; and Conclusion.

I. Terms

The following terms are used in this specification:

The terms "message" or "message data" or "data message" generally are used interchangeably in this specification. These terms mean any data transmitted from one machine for receipt by any other machine. The term "message payload" generally refers to the portion of a data message that includes the information to be transferred to other users in the session.

"User" means a party connected to a communication network in some manner, such as through a conventional subnet, intranet, or Internet connection. The connection may be any conventional connection, such as wired connections, wireless connections, or any conventional connection known in the art.

"Session" means a meeting of a plurality of network users communicating with one another over a communication network. Users involved in a session may be located on a common subnet, on different subnets, or both. The communication may be visual, audio, or a combination thereof.

"Participant" means a user involved in a session.

"Machine" means any device used in communicating over a communication network. A "machine" includes, but is not necessarily limited to: computer terminals or workstations, desktop PCs, pen or stylus-based PCs, notebook and/or laptop computers, palmtops, PDAs, telephones, and the like.

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

Aspects of the present invention relate to systems, methods, and data structures useful in communicating messages over a peer-to-peer network. Such systems, methods, and data structure may be used, for example, to communicate messages over transient connections to participants in a collaborative session in a peer-to-peer manner.

One more specific aspect of this invention relates to methods of transferring data on a network. One example of this aspect of the invention includes: (a) establishing a session for data transfer, wherein the session includes plural participants; (b) broadcasting a message from a participant involved in the session, wherein the message includes at least: a broadcasting participant identifier, a message identifier, session information, and a message payload; (c) determining whether a user that receives the broadcasted message is a participant in the session; and (d) when the user is a participant in the session, processing the message for the user. Determining whether the user is a participant in the session may, in at least some examples of the invention include: (a) determining whether the user is active in the session or (b) determining whether the user is included in a session participant list. Participants may be freely added to and/or may freely leave the session without adversely affecting the data transfer to other participants.

In some example methods according to the invention, prior to processing a newly obtained message for a user or any participant, the method further includes determining whether the user or participant has received all previous messages in the session. If any unreceived messages are discovered, these messages can be obtained for the user or participant. The unreceived messages may be obtained in any suitable manner. For example, they may be obtained via a broadcast from another participant in the session, optionally after the user or participant needing the message(s) transmits requests for the missing messages. In some examples of this aspect of the invention, the session participants will randomly determine whether to transmit one or more of the unreceived previous messages when a missing message request is received. Message requests and missing message transmissions can be repeated until the user receives all messages in the message history.

Determining whether a user is a participant in a session also may be accomplished in any suitable manner without departing from the invention. For example, the user's identification (e.g., an ID number) may be checked against a master listing of all users authorized to participate in a session. As another example, one or more existing session participants may receive an indication that a new user is present or available on the network, and the user may be added to the session, optionally after asking one or more participants in the session whether the new user should be added to the session. As still another example, after receiving the indication that the new user is present or available on the network, the method may further include inviting the new user to join the session (optionally after asking at least one participant in the session whether the invitation should be issued) and adding her only if the invitation is accepted.

Another aspect of the present invention relates to methods for gaining access to an ongoing session. Some example methods of this aspect of the invention include: (a) accessing a network on which a session is taking place, wherein the network is accessed by a user not active in the session, and wherein the session includes plural participants capable of transmitting and receiving message data; (b) determining whether to add the user as a participant in the session; and (c) when the user is added to the session as a participant, broadcasting all messages previously transmitted during the session to the user. Determining whether to add the user to the session may be accomplished in any suitable manner, including the various manners described above.

Additional aspects of this invention relate to methods of communicating messages between plural participants in a session. Some examples of these aspects of the invention include: (a) connecting at least a first participant workstation and a second participant workstation in a peer-to-peer manner, wherein each participant workstation is capable of broadcasting message data to other participant workstations in the session in a peer-to-peer manner and receiving broadcast message data from other participant workstations in the session in a peer-to-peer manner; (b) broadcasting a first message by the first participant workstation; (c) receiving the first message by at least the second participant workstation; and (d) broadcasting the first message from the second participant workstation to at least one other participant workstation in the session that did not receive the first message when broadcasted from the first participant workstation. In addition, in at least some examples of these aspects of the invention, new participant workstations can be added to the session, and these newly added workstations are able to obtain the earlier messages in the session, including messages from workstations that have left the session, from participant workstations that remain engaged in the session.

Yet another aspect of this invention relates to systems for processing data received over a network during a session involving data transfer between plural participants on the network. Such systems, in at least some examples of the invention, may include: (a) a receiver adapted to receive a broadcast message from a participant involved in the session, wherein the message includes at least: a broadcasting participant identifier, a message identifier, session information, and a message payload; and (b) a processor programmed and adapted to determine whether a network user receiving the message is a participant in the session, and when the user is a participant in the session, processing the message. The processor may determine whether the user is a participant in the session, in at least some examples, by at least one of: (a) determining whether the user is an active participant in the session or (b) determining whether the user is included in a participant list for the session. Prior to processing the message, the processor further may determine whether the user has received all previous messages in the session, and if any messages have not been received, a broadcast system may be activated to transmit a request for the previously unreceived messages in the session.

Still another aspect of this invention relates to workstations useful in performing various methods, including the methods according to the invention described above. Some example workstations according to this aspect of the invention may include: (a) a connection system adapted to access a network on which a session is taking place, wherein the session includes plural participants capable of transmitting and receiving message data; (b) a processor programmed and adapted to determine whether a user of the workstation is a participant in the session; and (c) a message receiving system adapted to receive message data transmitted during the session when the user is determined to be a participant in the session.

Other examples of this invention relate to systems for communicating messages between plural participants in a session. Such systems, in at least some examples of the invention, may include a plural participant workstations connected in a peer-to-peer network, wherein at least some of the participant workstations are capable of broadcasting message data to other participant workstations in the session over the network and receiving broadcast message data from other participant workstations in the session over the network. In systems according to some examples, the various individual participant workstations can freely exit the session, and the message data broadcast by the exiting participant workstation before exiting from the session can be obtained by other participant workstations, if necessary, from a remaining participant workstation that had previously received that message data. In addition to leaving an existing session, new participant workstations can freely enter the session and obtain any previous message data (including message data from workstations that have since left the session) from one or more participant workstations remaining in the session.

In another example aspect of the invention, any machine on the subnet and/or any machine that receives incoming message data from a session, even those not actively participating in the session, may receive, log, and maintain the incoming message data. Therefore, even machines not involved in a specific session may rebroadcast data to newly arriving participants in the session and/or reply to missing message requests in the session, in at least some examples of this invention.

Aspects of this invention also relate to computer-readable media having stored thereon data structures for transmitting message data to participants in a session. In some examples, this data structure may include: (a) a first data field containing data representing a message ID; (b) a second data field containing data representing session information; and (c) a third data field containing data representing a message payload. The data representing the session information, in at least some examples of this invention, may include data representing at least one member selected from the group consisting of: a session ID; a session participant list; and a session message history. In still additional examples, the data structure further may include a fourth data field containing data representing an identifier of a participant broadcasting the message data.

Another example data structure useful in at least some systems and methods according to the invention may include a data structure for transmitting a user's identification data to a network, optionally when the user is involved in a data transfer session that includes plural participants. In at least some examples, this data structure may include: (a) a first data field containing data representing a user's identity; (b) a second data field containing data representing identification information relating to the data transfer session; and (c) a third data field containing data representing the user's history in the session. The data representing the identification information relating to the data transfer session may include, for example, data representing at least one member selected from the group consisting of: a session ID and a session participant list. The data representing the user's history may include, for example, data representing at least one member selected from the group consisting of: a session ID; a message ID list identifying at least a last message processed by the user's workstation in the session; and a message ID list identifying at least a last message transmitted by the user in the session.

The various systems, methods, and data structures according to the invention may be used for communicating any message data without departing from the invention. In some examples, the message data may include electronic ink data, textual data, graphics, etc. As another example, the session may be in the form of a "virtual whiteboard" session in which plural session participants may add, delete, or modify message data (e.g., each participant's individual computer screen may show a rendering of messages data, and the participant can add to, delete from, and/or modify the data, and the additions, deletions, and/or modifications made by one participant also will appear on the screens of the other participants). Also, while any suitable protocol may be used for sending the message data to the various session participants, in some examples of the invention, the message is broadcast using user datagram protocol ("UDP") and/or transfer control protocol ("TCP"). The following describes the systems, methods, and computer-readable media according to the present invention in more detail.

III. Example Hardware

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In some examples of the invention, plural users communicate with one another over a peer-to-peer network. These users, in some examples, may be participants in a session in which data messages from one participant are communicated to the other participants in such a manner that all participants can view and manipulate the data (e.g., an "electronic whiteboard" session or another type of collaborative session).

Figure 3A:
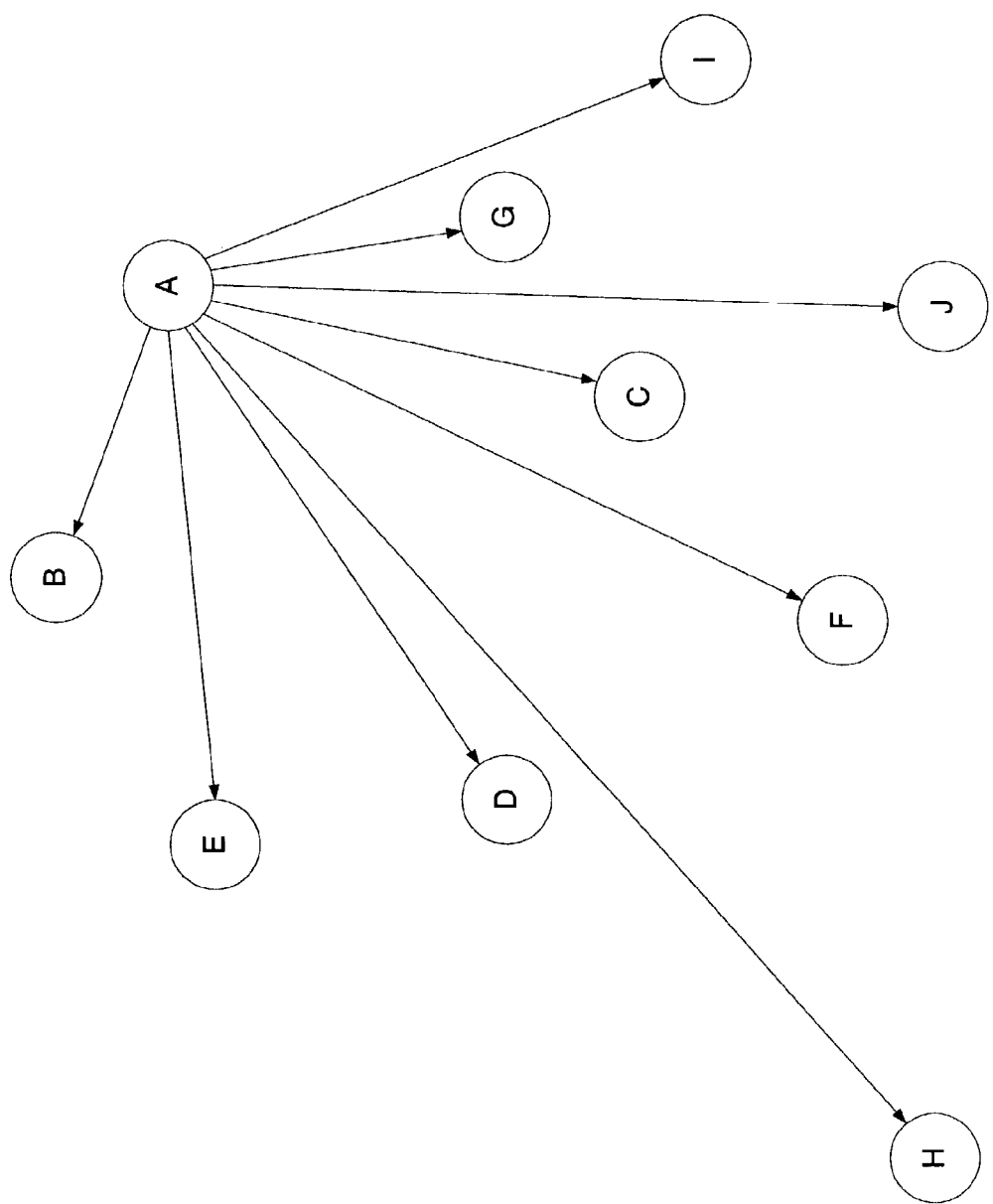
FIGS. 3A and 3B generally illustrate a peer-to-peer connection network that may be used in systems and methods according to some examples of this invention.
Figure 3B:
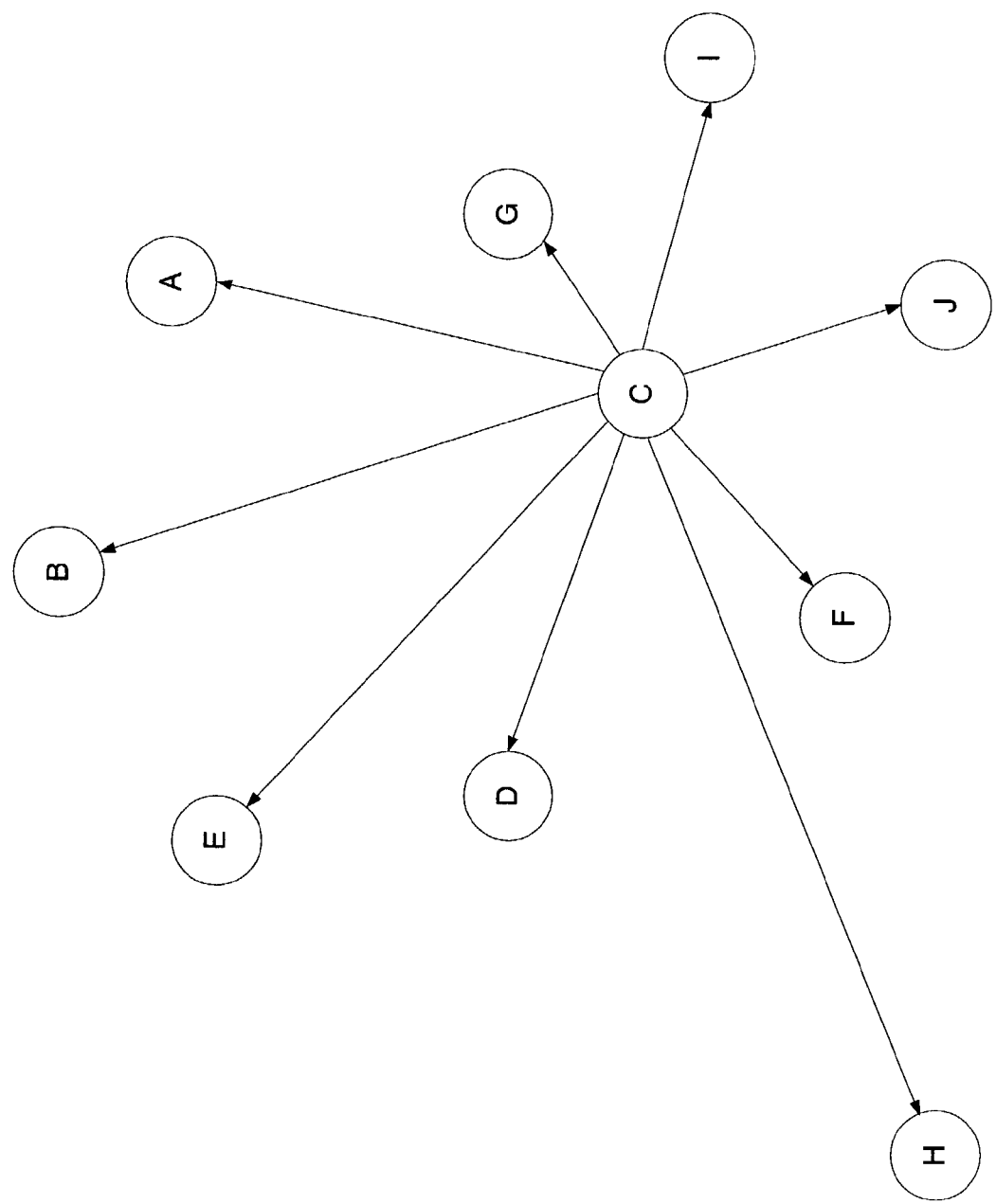

FIGS. 3A and 3B illustrate examples of participants A-J communicating with one another as it may occur in some examples of this invention: In some example systems and methods according to the invention, rather than having all of the participants A-J connect to a common server or designate one of the participant's workstation as a de facto server, the participants A-J communicate over a peer-to-peer network, using, for example, workstations with general purpose computers like those illustrated in FIGS. 1 and 2. Communication in this manner may proceed in any suitable manner, including various conventional manners as are known in the art. In the illustrated example, each participant transmits (e.g., by broadcasting or directed transmission) his or her message data over the peer-to-peer network so that the other participants receive the data. FIG. 3A shows an example where participant A has broadcasted a data message to participants B-J. Then, in FIG. 3B, participant C has broadcasted a data message to participants A, B, and D-J. In this same manner, every participant A-J on the network (and indeed every user of the network) is capable of sending and receiving communications from the other participants (and users) of the network.

Any suitable system or protocol may be used for transmitting messages between participants and users of the network without departing from the invention. For example, message data may be directed to the various participants in a session over the network using TCP or UDP. TCP message transmissions are advantageous because TCP guarantees in order delivery of data packets, both to users on a common subnet and to users located on different subnets (e.g., delivery over the Internet or other communication network). UDP does not guarantee message delivery or in order message delivery.

As another example, systems and methods according to some examples of the invention may use the broadcast features of UDP and broadcast the message data to all users on a given subnet (TCP does not support broadcast transmissions). If the message data is encoded with a list of participants in the session, users on the network can look at the incoming message data, determine whether they are a participant in the session including that message data, and join into the session and/or process the message payload if they are a participant. Use of UDP broadcast messages for data transfer in this manner is discussed in more detail below.

UDP broadcasts of this type generally are limited to transmission to users located on a common subnet. However, bridging systems and methods may be used to bridge any of the UDP broadcast messages described in this specification to users on other subnets. While any suitable bridging system or method may be used without departing from this invention, suitable bridging systems and methods are described in U.S. patent application. Ser. No. 10/421,705 entitled "Bridging Subnet Broadcasts Across Subnet Boundaries," filed Apr. 24, 2003 in the names of inventors Philip Su and Robert Jarrett. This pending application is entirely incorporated herein by reference.

As noted above, however, UDP broadcasts have some limitations in that this protocol does not guarantee delivery and/or in-order delivery of message data packets to all users. Some example systems and methods according to this invention, however, have overcome this limitation by providing ways for the systems and methods to determine whether a participant is missing any messages and providing ways for missing messages to be retransmitted to users that did not receive them when originally transmitted. These aspects of the invention also allow late joining users to a session or those accidentally dropped from a session to easily "catch up" and receive any missed message data previously transmitted during the session. These aspects of the invention also are described in more detail below.

IV. Example Systems, Methods, and Data Structures According to the Invention

A. Data Maintained in Some Examples

FIG. 4 generally illustrates some of the information and data 400 maintained by a user workstation or other appropriate storage system in some examples of systems and methods according to this invention. Each user and/or computer workstation are/is identified by a unique identification number 402 that identifies the user and/or the workstation hardware to other users on the network. This user identification number may specifically identify the party logged onto the computer system and/or the hardware itself.

Each user potentially may be involved in any number of different collaborative sessions, illustrated in FIG. 4 by reference numbers 404*a* (Session 1) through 404*n* (Session n). Each session 404*a* through 404*n* may be identified by a unique identification number (406*a* through 406*n* in FIG. 4), and the workstation or other storage system may maintain an individual participant list (408*a* through 408*n* in FIG. 4) for each session. The participant list 408*a* through 408*n* for a session may simply include the unique user ID number 402 for each participant involved in the session and/or for each user authorized to join into the session.

Each session also may include a listing of messages involved in the session. In FIG. 4, the messages for Session 1 (404*a*) are assigned reference numbers 410*a* through 410*m*, and the messages for Session n (404*n*) are assigned reference numbers 420*a* through 420*k*. There is no limit to the number of messages that may be involved in a specific session. Each message (410*a* through 410*m* and 420*a* through 420*k*) includes its own unique identifier (identifiers 412*a* through 412*m* for messages 410*a* through 410*m*, respectively, and identifiers 422*a* through 422*k* for messages 420*a* through 420*k*, respectively). Moreover, each message (410*a* through 410*m* and 420*a* through 420*k*) includes its associated message payload (message payload 414*a* through 414*m* for messages 410*a* through 410*m*, respectively, and message payload 424*a* through 424*k* for messages 420*a* through 420*k*, respectively). The message payload may contain any suitable data, such as an electronic ink stroke, text information, graphical information, instructions to delete, move and/or modify ink, text, or graphics, and the like.

The unique identifiers for the user ID 402, the session ID 406*a* through 406*n*, and the message ID 412*a* through 412*m* and 422*a* through 422*k* may be assigned in any conventional manner known in the art. For example, globally-unique identifier numbers ("GUIDs") may be assigned to each of these values.

B. The Electronic Whiteboard

1. Independent Messages

FIGS. 5A through 5J illustrate examples of data messages that may be exchanged among plural participants in a session over a virtual or electronic whiteboard or other collaborative session according to at least some examples of this invention. Each of FIGS. 5A through 5J illustrate an example electronic whiteboard 500 as it may appear on the display screen of a participant's workstation as message data is exchanged. The participants may be connected together on a peer-to-peer network using UDP broadcast transmissions to transfer the message data in the manner described in conjunction with FIGS. 3A and 3B. The participants may be located at the same or different places without departing from the invention.

FIGS. 5A through 5J illustrate the electronic ink strokes associated with a collaborative effort by Participants A-C in writing the word "Break" on an electronic whiteboard. At least Participants A-C, at some time, are involved in the session during which this word is written on the electronic whiteboard, although others may be involved in the session and/or Participants A-C may leave the session at times without departing from the invention. Electronic ink data may be collected in any suitable manner, including conventional manners known in the art, and this electronic ink data may be provided, for example, as the message payload 414*a* through 414*m* from FIG. 4. The message payload may include data indicating various features of the electronic ink including, but not necessarily limited to: the electronic whiteboard points encountered by the pen during the ink stroke (or the location of a pen direction change and the new pen direction); the stroke location on the electronic whiteboard; the stroke color; other stroke characteristics (bolding, italicizing, highlighting, underlining, etc.); and the like.

Figure 5F:
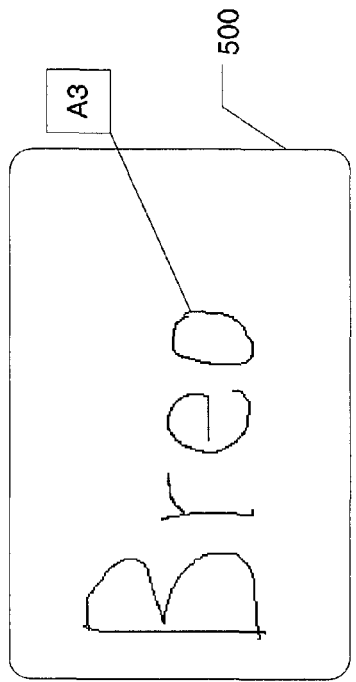
FIGS. 5A through 6E illustrate examples of data messages transferable through systems and methods according to this invention useful in explaining various features of some examples of the invention.
Figure 5H:
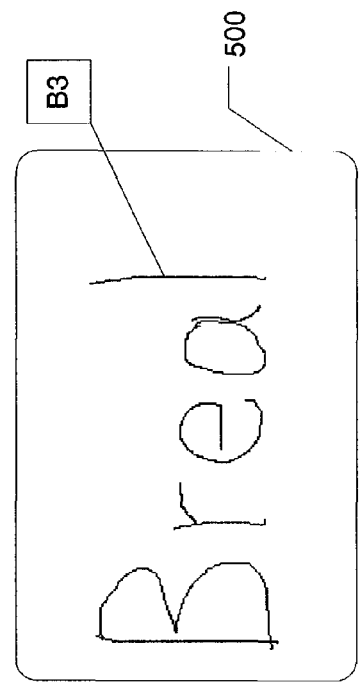
Figure 5E:
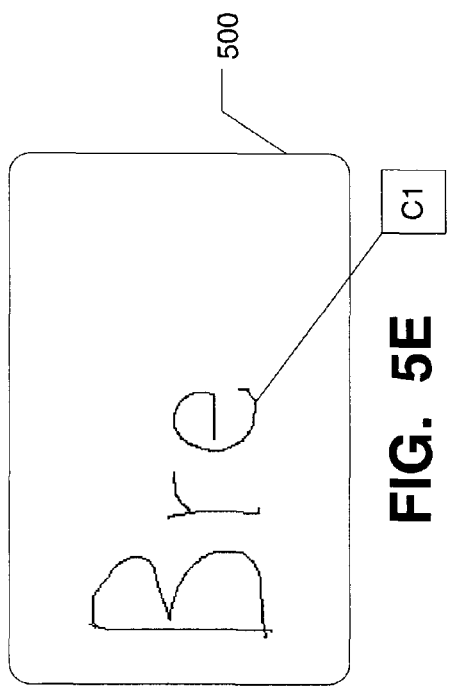
Figure 5G:
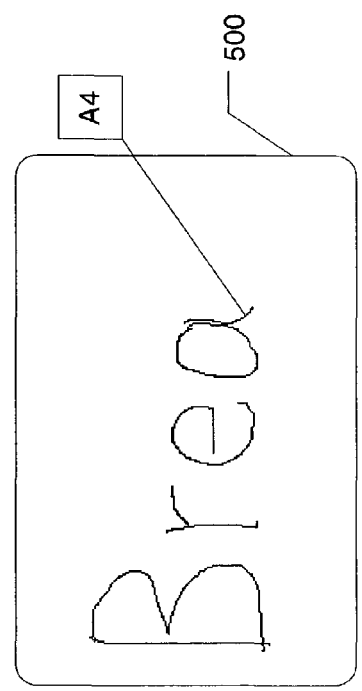
Figure 5J:
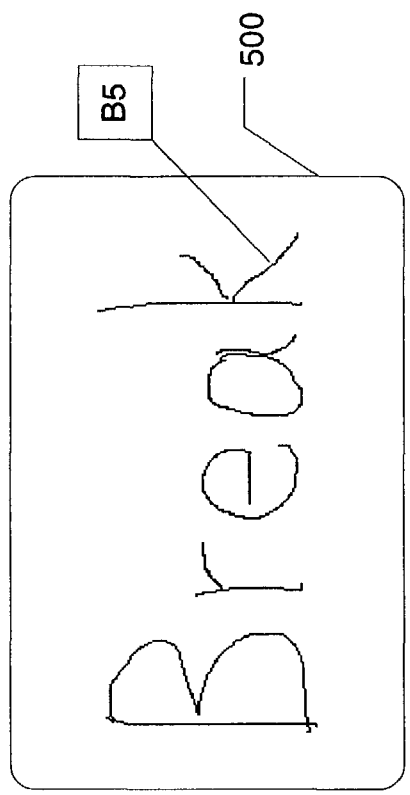
Figure 5I:
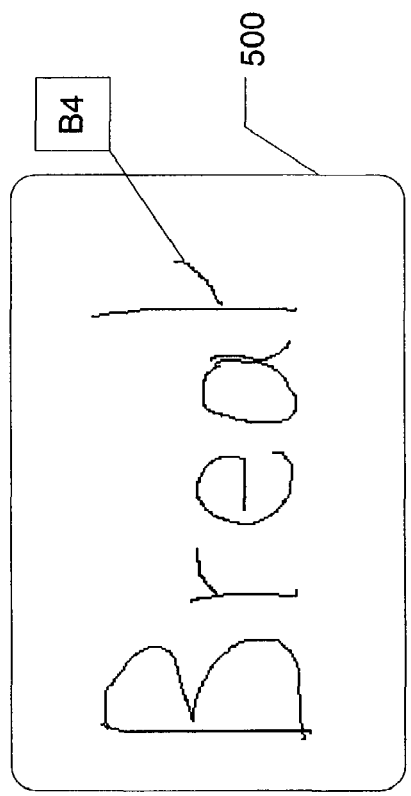

As shown in FIGS. 5A and 5B, Participant A has used the electronic whiteboard 500 as it appears on his/her computer workstation to write the letter "B." Each stroke of the electronic pen in this example constitutes at least one individual data message (Message A1 and Message A2) that is sent to the other participants in the session from Participant A's computer, e.g., via a UDP broadcast, a TCP transmission, or other suitable transmission protocol. After Participant A completes the letter "B," in a similar manner Participant B writes the letter "r" on his/her computer workstation using two electronic ink strokes and sends (at least) two data messages corresponding to these strokes to the other participants (Messages B1 and B2, FIGS. 5C and 5D). Then Participant C writes the letter "e" using one stroke and sends (at least) one electronic data message representing this stroke to the other participants (Message C1, FIG. 5E). After that, Participant A writes the letter "a" using two strokes and sends (at least) two data messages representing these strokes to the other participants (Messages A3 and A4, FIGS. 5F and 5G), and Participant B writes the letter "k" using three strokes and sends (at least) three data messages representing these strokes to the other participants (Messages B3, B4, and B5, FIGS. 5H, 5I, and 5J).

In the example illustrated in FIGS. 5A through 5J, each of the ink strokes is independent of the other strokes, so "time-ordered" delivery of the various data messages to each participant's workstation is not an important issue in this example (notably, the message data for each stroke, in this example, includes the stroke's absolute location on the electronic whiteboard (optionally with information to allow appropriate mapping to match up the location, resolution, etc. of the whiteboard on the other participant's hardware) such that one stroke's location does not depend on another stroke's location). In other words, if Participant B receives the letter "e" from Message C1 after he receives one or more of the strokes from the letter "a" (Messages A3 and/or A4) and/or even after he/she begins to write the letter "k," this does not matter. The strokes may appear on each participant's electronic whiteboard in any order and the final word will still appear correctly.

Also, although the illustrated examples in FIGS. 5A-5J show each stroke as constituting a separate data message, this is not a requirement. Any number of strokes, or even a portion of a single stroke, may be included in a single data message without departing from the invention. For example, if desired, the strokes involved in writing the letter "B" (FIGS. 5A and 5B) could be sent to the other session participants in a single data message without departing from the invention. As another example, very long and/or complex strokes may be broken up into two or more data messages for transmission to other participants without departing from this invention.

2. Dependent Messages

Figure 6A:
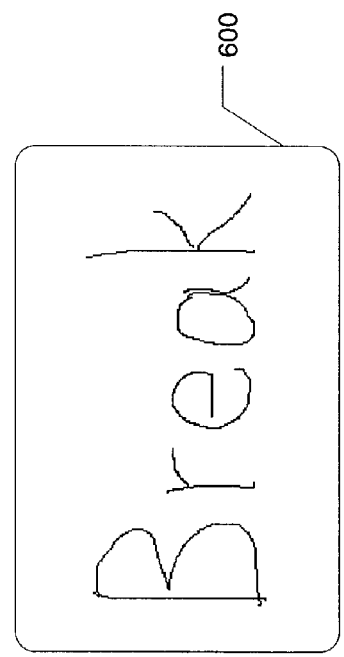
Figure 6B:
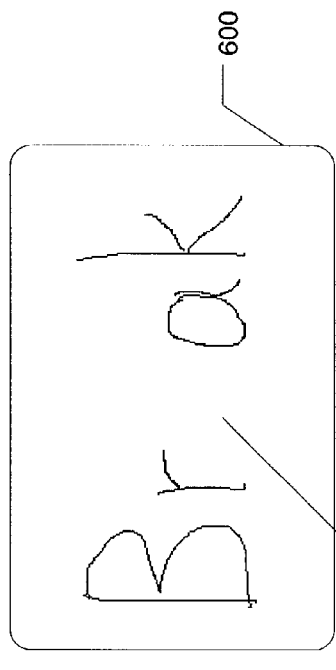

In some instances, however, some participants will send messages that take action on or depend on other messages. For example, a participant may change the color of one or more existing ink strokes, text, graphics or the like, highlight information, italicize information, underline information, bold information, delete information, enlarge information, shrink information, move information, copy information, or make some other change to its content or characteristics. FIGS. 6A through 6E illustrate one such example. FIG. 6A begins with the word "Break" as written in FIGS. 5A through 5J. Participants A, B, and C have decided to change this word to the word "Brake" using a collaborative effort on the electronic whiteboard 600. As a first step in making this change, as illustrated by comparing FIGS. 6A and 6B, Participant C used a "cut" feature to cut out the letter "e" (i.e., Message C2 from FIG. 6B deleted or cut message C1 from FIG. 5E). This step may be performed by Participant C using some suitable way of selecting the letter "e" (e.g., a lasso or box selection) and performing the cut action, e.g., in a conventional manner. As another alternative, the letter "e" could have been erased from the whiteboard using a conventional erase feature. Message C2 was sent to the other participants in the session to make this change. Accordingly, Message C2 in this instance depends on Message C1 (i.e., the message writing the letter "e" must have been received before the message performing the cut action could be performed).

Figure 6C:
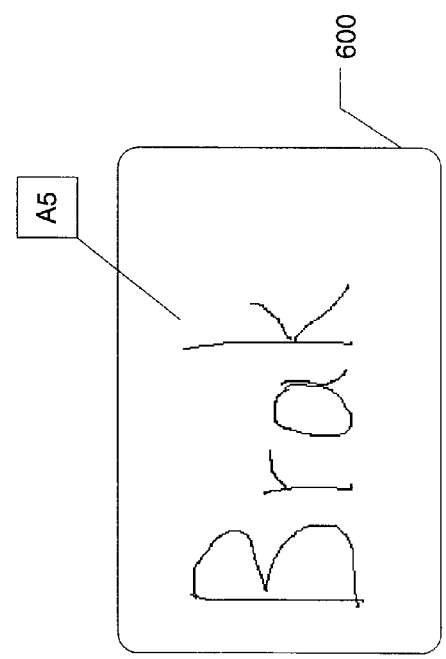

In the next step of the collaborative effort, Participant A moves the letters "ak" closer to the letters "Br." See FIG. 6C. Again, this can be accomplished in any suitable manner, for example, using a select action (e.g., lasso or box select or the like) and a drag action with a mouse, pen, or other suitable user input device. This action is sent to the other participants in the session as Message A5. Message A5 requires that at least Messages A3, A4, B3, B4, and B5 have taken place. Optionally, Message A5 may depend on Message C2 having taken place (which depends on Message C1 having taken place, as noted above), depending on whether the systems or methods according to the specific example are capable of handling overlapping information (e.g., using a layer structure or in some other suitable manner).

Figure 6D:
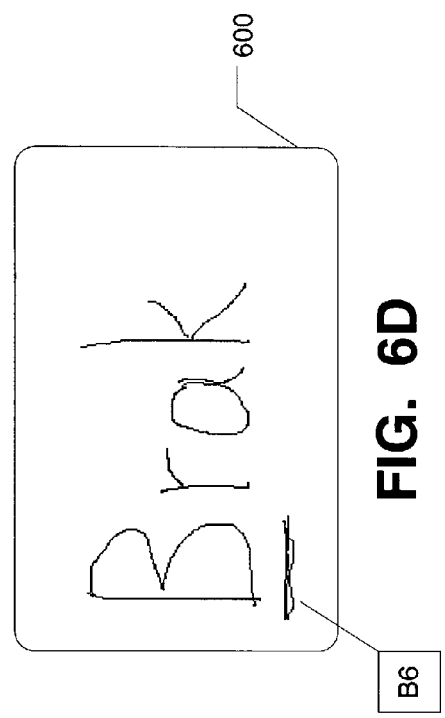

In the next step, as illustrated in FIG. 6D, the letter "B" is underlined using electronic ink by Participant B. This information is sent to the other participants as Message B6. Message B6 is again independent of all the other messages, because it does not modify, delete, or otherwise change the characteristics of any existing message data (e.g., ink strokes). Manually underlining in the manner illustrated in FIG. 6D is distinguished from use of electronically generated underlining as a modifier to ink, text, or graphics in that manual underlining in this manner is simply another ink stroke and does not modify the data structure of the ink or other text that it underlines.

Figures 6E, 7:
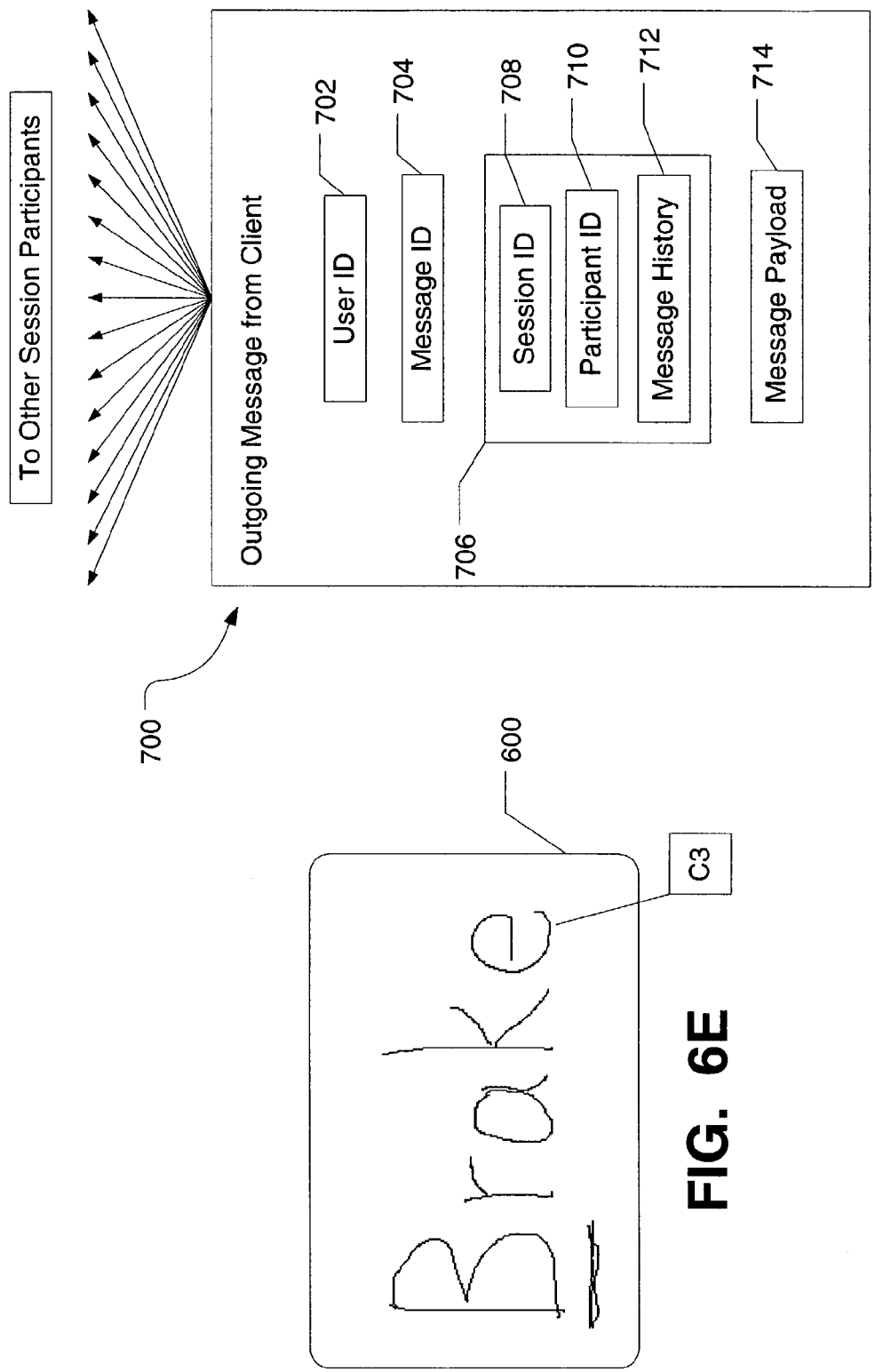
FIG. 7 is an example data structure for an outgoing broadcast data message useful in some examples of systems and methods according to the present invention.

FIG. 6E illustrates a "paste" action in which Participant C pastes the letter "e" deleted in Message C2 (FIG. 6B) after the now moved letter "k." This data message is sent to the other participants in the session as Message C3. Message C3 depends at least on prior performance of Message C2, which itself depends on Message C1 having taken place. Optionally, Message C3 may depend on Messages A3, A4, A5, B3, B4, and B5 having taken place, depending on whether the systems or methods according to the specific example are capable of handling the overlapping information (e.g., using a layer structure or in some other suitable manner). Again, systems and methods according to examples of the invention may handle this type of overlapping information and its display in any suitable manner without departing from the invention.

As an alternative, rather than using a paste action, as illustrated as Message C3 in FIG. 6E, any participant in the session could have simply re-written another letter "e" at the appropriate location. In this instance, the new stroke would not have been dependent on any other stroke, unless some dependency were needed to handle overlapping or layered information on the electronic whiteboard, as generally discussed above.

Any suitable manner of handling the dependency information can be used without departing from the invention. For example, a participant's machine sending a message may track the dependent information in the general manner described above by determining which data messages, at a minimum, must be performed in order to perform the action required by the participant's outgoing message. Then, when the message data is sent (e.g., broadcasted) to the other participants, it can be encoded to include the unique Message ID of any other message necessary to perform the functions required by the newly broadcast message. The receiving machines can then look at the dependency information and assure that all required "parent" messages are performed before the newly received message is performed. Another manner of handling dependency is described below in conjunction with FIGS. 7-8.

C. Data Structures of Outgoing Messages

FIG. 7 generally illustrates a data structure 700 for an outgoing message from a participant's workstation useful in various examples of systems and methods according to the invention. The data structure 700 in this example includes a field including data representing the user ID number 702 of the participant transmitting the message. This user ID may be the unique user identifier 402 discussed above in connection with FIG. 4, which may identify the specific user or participant sending the message. In addition, or as an alternative, the user ID 702 also may include hardware information, such as, information identifying the specific hardware sending the message, characteristics of the hardware and/or the data being sent and the like (e.g., display resolution information or the like so that the data can be accurately translated and mapped onto the various machines involved in the session).

Another field in the example data structure 700 includes the unique message identifier 704 of the message being sent. This message identifier 704 may correspond to the message identifiers 412a-412m and 422a-422k described above in connection with FIG. 4.

The example data structure 700 of FIG. 7 includes another field containing various information 706 about the session into which this new message is being directed. Various types of information may be included in this data field without departing from the invention. For example, as illustrated in FIG. 7, this data field may include the unique session ID number 708 into which the message payload is being directed. Also, this data field may include a list of participants 710 in the session (e.g., in the form of user ID numbers 702 for all participants in the session and/or all users authorized to participate in the session). Another possible portion of the session information 706 in the data structure 700 may include "message history" information 712. This message history information may include all the dependency information (e.g., all of the required parent message ID numbers 704) for this present message, as described above.

Finally, another data field in this example data structure 700 includes the actual message payload 714, which tells the receiving machines the action to be taken as a result of this message. As described above, this message payload 714 may include electronic ink information (e.g., ink strokes); text; graphics; information modifying electronic ink, text, graphics, or the like; and/or any other suitable or desired information.

While actually tracking the dependency and parent data message information is an effective way of assuring that no message action is processed before it should, doing so can be difficult (if not impossible) and/or computationally expensive, at least in some instances. Therefore, in accordance with some examples of the invention, an outgoing message like that illustrated in FIG. 7 may include some other type of message history 712. As an example, a machine sending out a message 700 may include the message identification numbers (704, 412a-412m, 422a-422k) of at least the last message processed on that machine. In some examples, the data structure 700 will include in the message history 712 the message identification numbers (704, 412a-412m, 422a-422k) of the last 5-10 messages processed on that machine, or even more. Then, when the receiving machines receive the transmitted new message 700, they will assume that the new message 700 depends on each of the last messages processed on the transmitting machine (from the message history 712). If the receiving machine has not yet received all of the last messages processed in the message history 712 of the message 700, it will not process the new message 700 until all of the messages in the message history 712 have been received.

Assuming that a receiving machine does not have one or more of the messages in the message history 712 of a new message 700, it will wait for the missing message(s) (optionally, sending a request for the message(s), as will be discussed in more detail below). When the missing message(s) is(are) received, the missing message(s) also will have a message history field 712 from the time it (they) was(were) originally sent, and the receiving machine will not process this newly received and previously missing message unless and until all messages in its message history 712 also are received. In this manner, a machine receiving a message 700 will keep checking the messages and message histories backward in time and will only process a newly received message 700 after all messages in the message history 712 have been received and processed.

As another example, as an alternative to or in addition to sending the last message(s) processed on a given machine, the outgoing message data 700 may include in its message history 712 a listing of one or more of the last messages sent by this specific machine. Any number of previously sent messages may be included in the message history 712 without departing from the invention, including, for example, 5-10 of the immediately previously sent messages. The receiving machines could then use this information in addition to or in place of the last processed message history described above, in the same manner, to assure that the new message 700 is not processed until all messages previously sent by this machine have been processed.

Optionally, if desired, if a later message deletes or cuts a previous message, systems and methods according to some examples of the invention need not wait for the deleted message or the message deleting it before proceeding with other processing. This pair of messages can be ignored and remain unreceived and unprocessed.

Various other ways of assuring that messages are processed in the proper order, assuring proper dependency, may be used without departing from the invention. For example, truly independent messages may be marked as such so that systems and methods according to some examples of the invention will know they can be processed immediately, without waiting for other messages. Additionally, any number of prior messages (previously processed and/or previously sent) may be included in the message history 712 without departing from the invention, for example, taking into consideration various factors, such as likelihood of a message not being received by a given user, network traffic, network speed, rate of incoming messages, number of participants in the session, type of connection, likelihood of a user disconnecting from the network, etc.

D. Processing an Incoming Message

Figure 8:
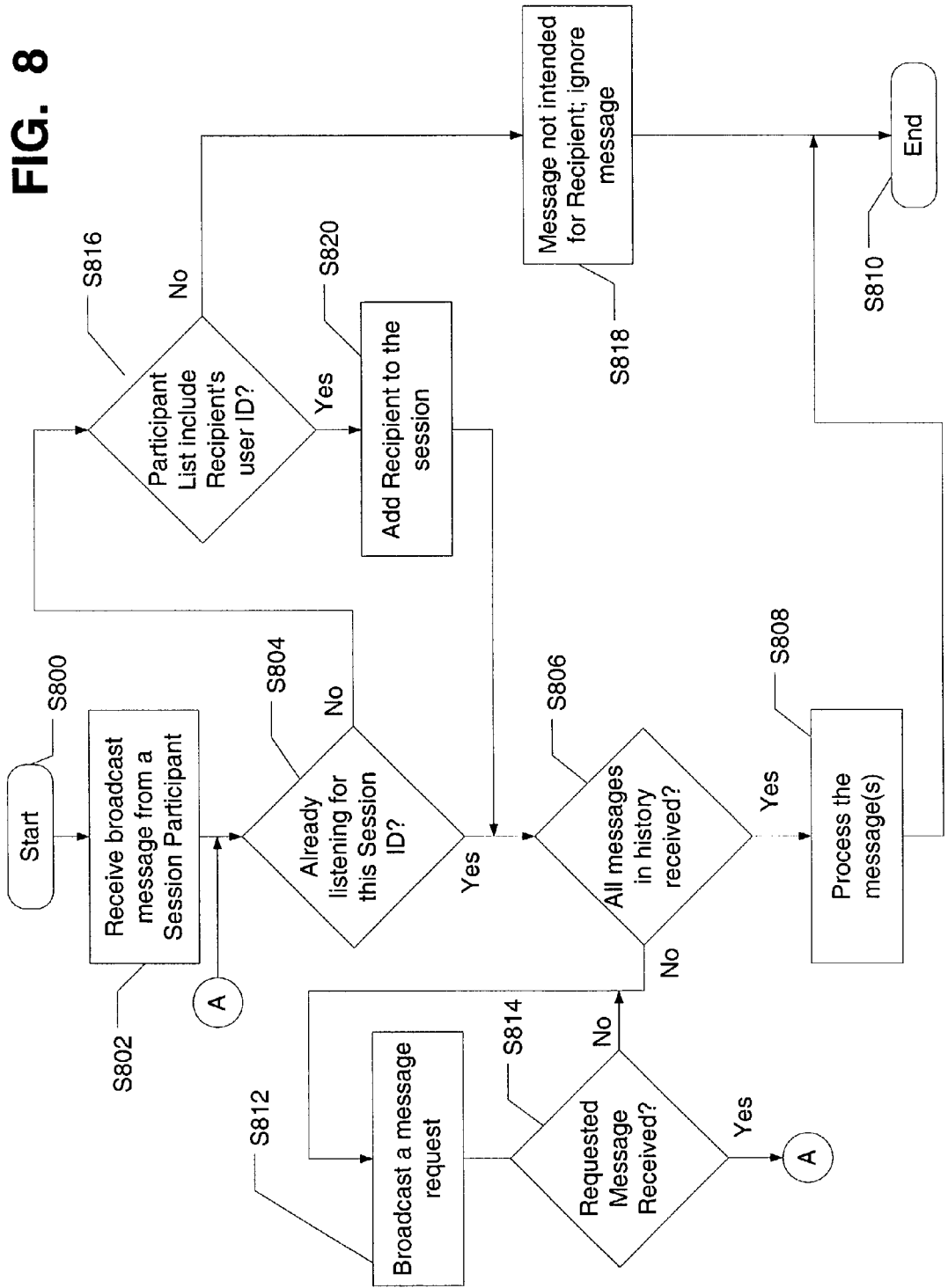
FIG. 8 is a flow chart illustrating examples of certain methods according to the invention.

FIG. 8 illustrates a flow chart describing various aspects of processing messages in some examples of this invention. As an aide in understanding, the information in FIG. 8 will be discussed in conjunction with the reference numbers provided in FIG. 7. In this example, messages 700 are broadcast over a peer-to-peer network, for example, using UDP's broadcasting capabilities. As shown, the process starts (S800) when a participant in a session sends a broadcast message 700 that is received by a user listening on the network (S802). Recalling that UDP broadcast messages are sent to all users on a subnet and are not directed to specific users of the subnet, a subnet user that receives a broadcast message 700 in systems and methods according to this example of the invention next determines whether he/she is listening for this Session ID number (S804). This may be accomplished, for example, by looking at the Session ID number 708 included with the message 700. If the recipient user is listening for this Session ID number (answer Yes at S804), the recipient user's computer next checks to see whether all prior messages in the message history 712 of the message 700 have been received (S806). If Yes, the new message 700 is processed (S808), and the procedure ends (S810) (e.g., begins processing the next message or waits for the next message).

If, at S806, it is determined that the recipient user had not received all previous messages noted in the message history 712 of the newly received message 700 (Answer "No"), the recipient user's machine will then transmit or broadcast a request for any missing messages (S812). Then, after a suitable waiting time, the systems and methods according to this example of the invention determine if the requested message(s) has (have) been received (S814). If No, S812 and S814 will be repeated until all messages in the message history are received (appropriate time out and/or error messages may be provided if one or more missing messages are never received). When the incoming missing messages are received (Answer "Yes" at S814), the system returns to S804 (see bullet A), and the message histories of the newly received messages are checked to assure that all messages in their message histories are received. Alternatively, bullet A could return to the procedure just prior to S806. In this manner, the process works backward in time and begins processing newly received messages only when all messages in their message history have been received and processed.

If at S804 the incoming message recipient is not listening for this Session ID number (Answer "No"), systems and methods according to this example of the invention next check to determine if the Participant list 710 in the messages 700 includes the receiving user's ID number (S816). If No, this message was not intended for the recipient user (S818), and the message is ignored by the recipient user's workstation. The procedure ends (S810) (e.g., the recipient user may continue listening for new broadcast messages). As an alternative, users not involved in a specific session could maintain the incoming messages and be available to rebroadcast messages to new participants and/or in response to missing message requests, as will be described in more detail below.

If at S816 the participant list 710 of the incoming message 700 includes the recipient user's ID number (Answer "Yes"), the recipient user can be added into the session (S820), and the check to assure that all previous messages in the message history 712 can begin (S806).

At S812, a recipient of an incoming new message 700 broadcasts a request for a message in the message history 712 of the new message 700 that was not previously received. This can happen, particularly when using UDP as the transmission protocol, because, as noted above, UDP does not guarantee delivery of messages to all intended recipients. Accordingly, systems and methods according to some examples of the invention, on at least some occasions, will need to broadcast messages to participants that did not receive the messages when originally sent. Additionally, latecomers to a session will need to be brought up to date by obtaining all previous messages in the session. By using the procedure described in FIG. 8, all participants in the session can easily obtain any previously missing messages as soon as an incoming message informs them that they are missing a message in the message history, without unduly slowing down the system or procedure.

When a request for a missing message is broadcast (S812), all participants in the session may receive the request in this example of the invention (e.g., as a UDP broadcast). If all recipients rebroadcast the missing message, this would unduly clog the system with repetitive broadcast messages, a problem that is exacerbated when a large number of participants are included in a session. Accordingly, in some examples of the invention, each participant in a session will randomly decide whether to rebroadcast the missing message for receipt by the requester when such a request is received. For example, if a session includes six participants, when a missing message request is broadcast, each of the remaining five participants will randomly determine whether to rebroadcast the missing message (e.g., randomly select a number between 1 and 5 and transmit the message if the selected number is 1). If none transmit the message, another missing message request will go out (as discussed above) and another random selection procedure will occur. This procedure can repeat until the requesting party receives the missing message. By using this type of procedure to supply missing messages, any participant in the session can supply missing messages to the other participants or to new participants, leaving participants free to enter and leave the session while still keeping all of their previously transmitted data readily available to all in the session.

In some examples of this aspect of the invention, the determination as to whether a specific user will rebroadcast a missing message may consider various factors including, for example, the likelihood of a message being lost in a particular network, network traffic, network speed, number of participants in the session, type of connection, etc. For example, if a specific network and/or session set-up typically loses 50% of UDP broadcast messages and a given user is one of five users receiving a missing message rebroadcast request, any particular user may be programmed to have a ⅖ probability of rebroadcasting a message in response to a missing message rebroadcast request, to compensate for the fact that one out of two broadcast messages are likely to be lost.

As an alternative, when a new participant comes into a session, at any time, a mechanism may be in place to automatically provide all previously transmitted messages to that new participant (e.g., each message retransmitted by the original transmitting participant, by one or more selected participants, and/or in any other desired or suitable manner). As another alternative, the original transmitting participant could retransmit any requested missing messages, if he or she remains in the session, and another party at random (or in some predetermined order) could retransmit the requested missing messages if the originally transmitting participant no longer remains in the session. Any way of determining the participant for re-transmitting a missing message in response to a missing message request may be used without departing from the invention.

E. "Ping" Data

FIG. 9 illustrates a data structure 900 that may be useful in assisting systems and methods according to some examples of the invention in discovering potential new participants for a session and/or in discovering that a user may join an existing session. As a session is underway, the participants of a session will periodically transmit certain identifying data, e.g., by broadcasting the data on the subnet using UDP broadcast capabilities. This data, also called "ping data" in this specification, periodically informs other users on the network of certain information. Ping data of this type is used conventionally, for example, in wireless connections and communications.

In examples of this aspect of the present invention, the data structure 900 may include various information of importance relating to a session. First, a field may be provided in the data structure 900 containing information identifying the user sending out the ping (e.g., a user ID number 902, as described above, which may identify the party using a specific machine, the hardware, both, and the like). Another field in the data structure 900 may include information relating to the session(s) 904 in which this user workstation is involved. As noted above, each user's computer or workstation may be involved in more than one session. For each session, the ping data may include various information, such as Session ID number information 906*a* and 906*b*, a session participant list 908*a* and 908*b* (e.g., including user ID numbers of each participant in the session), and the like.

The ping data 900 also may include information relating to message history for each session with which the user is involved. This data field is shown at reference number 910 in FIG. 9. As an example, for each session, the ping data may include data indicating the last message or messages processed by this computer (fields 912*a* and 912*b*) and/or data indicating the last message or messages sent by this computer (fields 914*a* and 914*b*) (e.g., in message ID number form). Any desired number of messages may be included in data fields 912*a*, 912*b*, 914*a*, and 914*b* without departing from the invention, e.g., 5-10 messages. Use of "ping data" in this manner helps keep all users up to date and prevents individual messages from being "lost" for a long time period (e.g., if a message is lost and a long time passes before the next message is sent, without using periodic "ping data" to send message IDs, the lost message could remain lost for an extended time, e.g., until the original message sender (or another participant) sends another message).

Figures 10, 11:
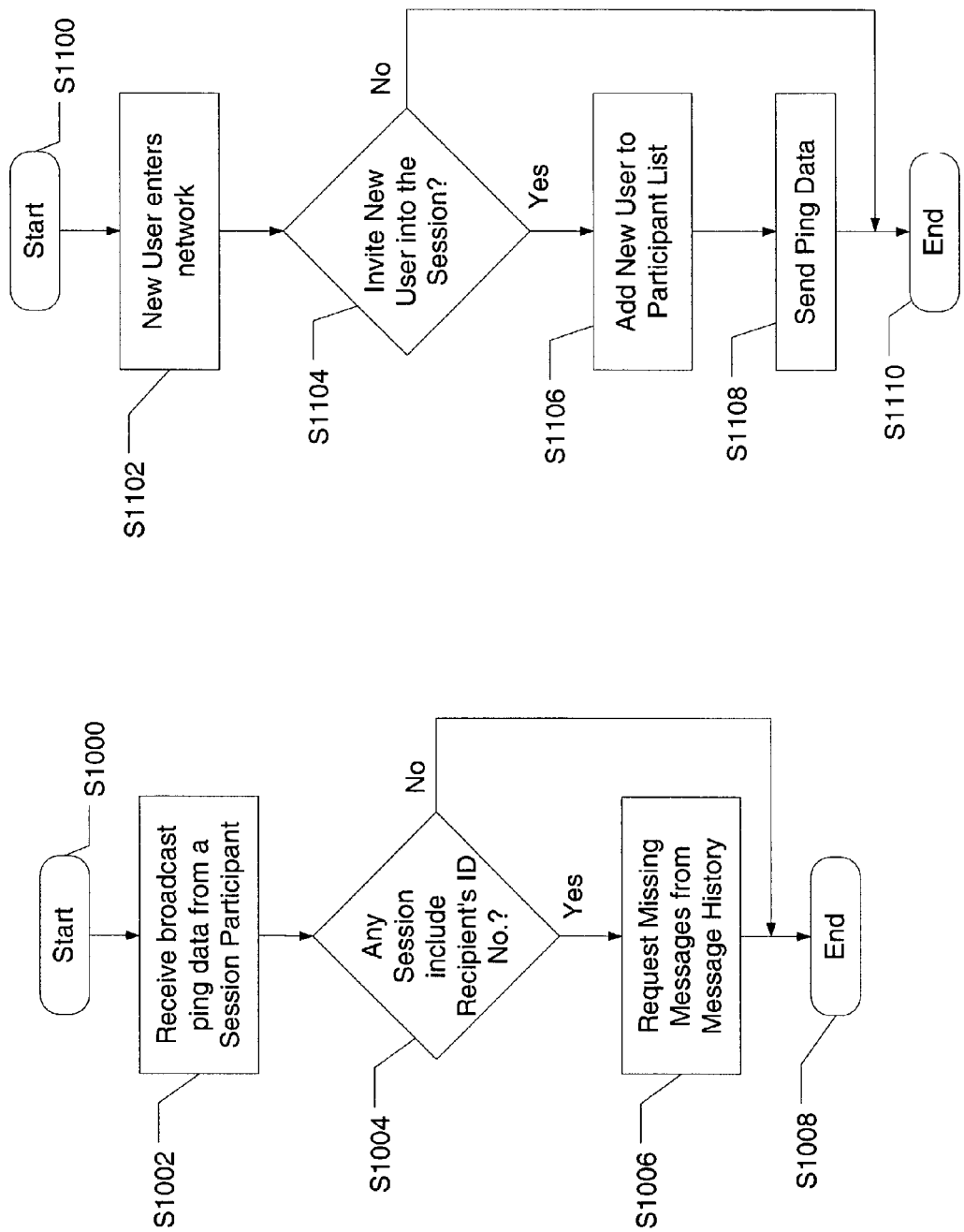
FIG. 10 is a flow chart illustrating examples of methods of adding new users as participants to a session.
FIG. 11 illustrates a flow chart showing examples of other methods of adding new users as participants to a session.

In at least some examples of the invention, this ping data may be used in conjunction with a procedure like that illustrated in FIG. 10 to easily add users as new participants into a session. For example, the procedure of FIG. 10 starts (S1000) when a user enters a network in which a session is taking place. The newly entering user eventually will receive this type of ping data from participants in the session (S1002). If the user's ID number is included din the ping data it receives from at least one participant in a session (S1004) (e.g., as part of a participant list 908*a* or 908*b*) (Answer "Yes"), the user's system will know that the user may join this session. The user's machine can then request the messages it is missing from the message history 910 included with the ping data 900 (S1006) and be brought up to date in the session, e.g., by the procedure described in connection with FIG. 8. If desired, the user can be given an option of deciding whether he/she wishes to join a session, e.g., through a question or dialog box or in any other suitable manner. The procedure of FIG. 10 can then end (S1008), and the user's system can listen for additional ping and/or message data.

If, at S1004 the procedure determines that the user's ID number is not present in participant lists 908a or 908b in the received ping data 900 (Answer "No"), this procedure can end (S1008), skipping S1006, and the system can continue listening for additional ping and/or message data.

FIG. 11 includes a flow diagram describing another procedure through which a user, as a potential participant in a session, may be discovered and invited into a session. As the procedure starts (S1100), a user not involved in a specific session enters a network on which a session is taking place (S1102). This fact may be recognized by participants of the session, for example, when the newly entering user's computer broadcasts ping data 900 (e.g., via a UDP broadcast). If the newly entering user is not involved in any sessions, the ping data 900 may be limited to the user ID number 902, as shown in FIG. 9. When one or more participants in the session receive this newly entering user's ping data information, the system or method according to this example can prompt one or more of the existing participants whether the newly entering user should be invited to participate in the session (S1104). If the participants decide to invite the newcomer into the session (Answer "Yes"), the newcomer's user ID number may be added to a participant list for the session (S1106). Then, ping data 900 including the newcomer's user ID number in fields 908a or 908b may be sent (S1108). As an alternative, the next data message 700 in the session also will include the newcomer's user ID on the participant list 710. When the newcomer receives this ping data 900 and/or message data 700, he will note his user ID number in the ping data 900 and/or message data 700, and the procedure of FIGS. 8 and/or 10 can be followed. The invitation procedure of FIG. 11 then ends S1110. Optionally, the new user may be invited to join the session, as described above in relation to FIG. 10.

If at S1104 the participants in the session decide not to invite the newcomer to the session (Answer "No"), S1106 and S1108 are skipped, and the procedure ends S1110. Ping data 900 also may be used to allow others to determine when a particular user has left a session. For example, if a session participant's ping data 900 is not received within a predetermined time interval (e.g., four times the ping data transmission frequency), other participants may determine that this participant has left the session. If desired, in some example systems and methods, this former participant's ID may be removed from the session participant list. Optionally, the system may prompt the remaining participants in the session to ask whether the former participant should be removed from the session's participant ID list.

F. Conflicting Messages

Systems and methods according to at least some examples of this invention will include protocols and procedures for handling simultaneous, near-simultaneous, and conflicting instructions. Inevitably, in collaborative systems and methods of this type including multiple users independently capable of adding input, some message data transmitted by the various parties will conflict. For example, one participant could seek to cut an ink stroke, strokes, text, or graphics from the electronic whiteboard at precisely the same time that another participant seeks to change color, size, or another characteristic of some or all of that same stroke, strokes, text, or graphics.

This situation can be handled in any suitable manner without departing from the invention. For example, if all workstations in the session are operating on a common network utilizing a common central clock, each message may be stamped with a transmission time stamp based on this central clock, and the order of message processing could be based on this time stamp. For two or more messages that are transmitted at precisely the same time, a hierarchical ordering of some sort may be used to determine which message will take precedence. For example, an alphabetical and/or numerical hierarchical ordering may be used based on the user ID number for each participant involved in the session. As another example, hierarchy could be established based on the time the conflicting participants entered the session. Many other possibilities, including a random selection of one message over the other(s), also may be used without departing from the invention.

Because messages may be broadcast over a peer-to-peer network in at least some examples of the invention, two conflicting simultaneous messages may be received at some of the participants' workstations in the wrong order, thereby resulting in processing of the lower hierarchical message before the participant's workstation even knows that the higher hierarchical message exists. For example, assume Participant A sends Message A10 instructing deletion of an ink stroke at precisely the same instant that Participant B sends Message B10 instructing enlargement of that same ink stroke. These two messages conflict. Then assume, because of the hierarchical protocol, Message A10 has precedence over Message B10 (e.g., based on an alphabetical/numerical ordering of the conflicting message IDs or the conflicting transmitting user IDs. Because each of Participants A and B communicate with all other participants in a peer-to-peer manner in this example, Participant C (as well as others) may receive Message B10 before Message A10. At the time Message B10 is received, Participant C's workstation may know nothing about Message A10, and if all prior messages in Message B10's history are present at Participant C's workstation, that workstation may process Message B10 and then later receive Message A10. In that instance, when it receives Message A10, Participant C's workstation may perform an "undo" function to undo all messages processed until Message B10 is undone. Then Message A10 will be processed on Participant C's workstation and Message B10 will be discarded (as will any other messages that depended from Message B10). The other "undone" messages that were not dependent upon Message B10 will again be processed by Participant C's workstation in the original or time stamped order.

Of course, other suitable procedures and protocols may be used for processing conflicting messages without departing from the invention.

G. Establishing a New Session

A new session may be initiated in any desired or suitable manner without departing from the present invention. For example, when launching an electronic whiteboard application program or other application program, the program could prompt the launching party to enter names or user ID numbers of the desired or authorized participants. As another example, when an application program of this type is launched, potential participants in the session may be identified and added via their ping data, as described above. As still another example, when a program of this type is launched, the launching party could access a menu of available or potential participants and select possible participants from this listing. These options are merely examples. Combinations of these possibilities and/or other possibilities may be used without departing from the invention.

H. Security

Various examples of the present invention, as described above, utilize UDP broadcasts to transfer message and/or ping data to participants in the session. As noted above, UDP broadcast data transmits indiscriminately to all users on the subnet (and is bridgeable to other subnets) even if at least some of those users are not intended to be involved in the session. While this feature is advantageous in that it can allow users to freely join in and leave a session, it also poses a potential security risk, as others will be exposed to the message data in the session.

This fact can be addressed in any suitable manner without departing from the invention. For example, encryption, scrambling, and/or other suitable security methods may be used to prevent unauthorized access to a session and/or message data. As another example, more secure and directed communication may be used, in at least some examples of the invention, to avoid broadcasting at least some of the message and/or ping data. Any other suitable security technique, including techniques conventionally known in the art, may be used without departing from the invention.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. For example, while many aspects of the invention are described in terms of an "electronic whiteboard session" or other collaborative session, those skilled in the art will recognize that the invention is not limited to these types of collaborative sessions. Rather, aspects of the invention can be broadly applied for various types of communications between different users. Also, various changes and modifications may be made without departing from the spirit and scope of the invention, as defined in the appended claims.

The invention claimed is:

1. A method of transferring data on a network, comprising using one or more processors to perform the following computer executable acts:
adding a first computer as a participant in a collaborative session including a plurality of computers after determining, by the first computer, that the first computer is included in a session participation list;
receiving, at the first computer, after adding the first computer as a participant, a first broadcast message from the session, the first broadcast message being a message generated by a second computer different from the first computer, wherein the first broadcast message includes at least: a broadcasting participant identifier, a message identifier, session information, and a message payload;
responsive to determining that the first computer is a participant in the session, processing the first broadcast message generated by the second computer for display on the first computer, the message payload including electronic ink data;
deleting, by the first computer, at least a portion of the electronic ink data that was included in the first broadcast message; and
broadcasting to the session, by the first computer, a dependent broadcast message, the message payload of the dependent broadcast message including the deletion of the at least a portion of the electronic ink data included in the first broadcast message,
wherein the dependent broadcast message is dependent on the first broadcast message, and
wherein the session comprises a virtual whiteboard on which session computers are configured to add new messages, delete existing messages, or modify existing messages.

2. A method according to claim 1, wherein, prior to processing the broadcast message for the first computer, the method further includes:
determining whether one or more messages were previously sent in the session; and
determining whether the first computer has received all previous messages in the session.

3. A method according to claim 2, further including:
obtaining any previous messages in the session that were previously not received by the first computer.

4. A method according to claim 3, wherein the obtaining of the previous messages that were not received includes receiving the previous messages that were not received through a broadcast from at least one of the plurality of computers in the session.

5. A method according to claim 4, wherein the plurality of computers randomly determine whether to broadcast one of more of the previous messages that were not received according to an algorithm.

6. A method according to claim 2, wherein when it is determined that the first computer has not received all previous messages in the session, the method further includes:
(a) sending the request, by the first computer, for at least one previous message that was not received;
(b) broadcasting the at least one previous message that was not received to the first computer by at least one of the plurality of computers in the session; and
(c) repeating (a) and (b) until all messages in the session are received by the first computer.

7. A method according to claim 6, wherein each of the plurality of computers in the session randomly determines whether to broadcast one or more of the previous messages that was not received by the first computer according to an algorithm.

8. A method according to claim 1, wherein the session involves peer-to-peer communications.

9. A method according to claim 1, wherein the computers are not operatively connected to a common server.

10. A method according to claim 1, wherein at least one of the plurality of computers or the first computer is connected to the network via a wireless connection.

11. A method according to claim 1, wherein the message is broadcast using user datagram protocol.

12. A method executed on a first workstation comprising:
connecting the first workstation and a second workstation in a peer-to-peer manner, the workstations not being operatively connected to a common server, wherein each of the workstations is configured to broadcast message data to other workstations in a session in a peer-to-peer manner and receive broadcast message data from other workstations in the session in a peer-to-peer manner;
receiving, at the first workstation, a first message created by the second workstation and broadcast by the second workstation, the first message including a payload containing electronic ink data, the electronic ink data comprising at least one electronic ink stroke;
processing, by the first workstation, the first message for display on the first workstation;
modifying, by the first workstation, the at least one electronic ink stroke of the electronic ink data;

creating, by the first workstation, a second message including a payload containing the modification of the at least one electronic ink stroke of the electronic ink data, the second message being dependent on the first message;
including a message history in the second message, the message history including the dependency of the second message on the first message; and
broadcasting, by the first workstation, the second message, wherein the session comprises a virtual whiteboard on which session computers are configured to add new messages, delete existing messages, or modify existing messages.

13. A method according to claim 12, further including:
adding a new workstation to the session; and
obtaining the first message for the new participant workstation from a workstation present in the session other than the second workstation.

14. A method according to claim 12, wherein the first message is broadcast using user datagram protocol.

15. A method according to claim 12, wherein the second workstation leaves the session before the first message is broadcast by the first workstation.

* * * * *